United States Patent
Ajiro et al.

(10) Patent No.: US 7,121,367 B2
(45) Date of Patent: Oct. 17, 2006

(54) INSTALLATION STRUCTURE FOR ELECTRIC ROTATING MACHINE IN MOTOR VEHICLE

(75) Inventors: Keigo Ajiro, Kanagawa (JP); Hiroshi Tsunehara, Kanagawa (JP)

(73) Assignee: Nissan Motor Co., Ltd., Yokohama (JP)

( * ) Notice: Subject to any disclaimer, the term of this patent is extended or adjusted under 35 U.S.C. 154(b) by 120 days.

(21) Appl. No.: 10/699,829

(22) Filed: Nov. 4, 2003

(65) Prior Publication Data

US 2004/0112657 A1 Jun. 17, 2004

(30) Foreign Application Priority Data

Nov. 26, 2002 (JP) .............................. 2002-341939

(51) Int. Cl.
 *B60K 1/00* (2006.01)
(52) U.S. Cl. ...................................... 180/65.5; 301/6.5
(58) Field of Classification Search ............... 180/65.5, 180/65.1, 124.146; 301/6.5
See application file for complete search history.

(56) References Cited

U.S. PATENT DOCUMENTS

| | | | | |
|---|---|---|---|---|
| 2,726,726 A | * | 12/1955 | Le Tourneau ............... | 180/65.5 |
| 3,566,165 A | * | 2/1971 | Lohr ......................... | 310/67 R |
| 4,799,564 A | * | 1/1989 | Iijima et al. ................ | 180/65.5 |
| 4,913,258 A | * | 4/1990 | Sakurai et al. .............. | 180/242 |
| 5,087,229 A | * | 2/1992 | Hewko et al. ............... | 475/149 |
| 5,127,485 A | * | 7/1992 | Wakuta et al. .............. | 180/65.5 |
| 5,163,528 A | * | 11/1992 | Kawamoto et al. ......... | 180/65.5 |
| 5,322,141 A | * | 6/1994 | Brunner et al. ............. | 180/65.5 |
| 5,382,854 A | | 1/1995 | Kawamoto et al. | |
| 5,427,193 A | * | 6/1995 | Avakian ..................... | 180/65.5 |
| 5,472,059 A | * | 12/1995 | Schlosser et al. .......... | 180/65.5 |
| 5,633,544 A | * | 5/1997 | Toida et al. ............... | 310/67 R |
| 5,691,584 A | * | 11/1997 | Toida et al. ............... | 310/67 R |
| 5,894,902 A | * | 4/1999 | Cho .......................... | 180/65.5 |
| 6,113,119 A | * | 9/2000 | Laurent et al. ........... | 280/124.1 |
| 6,386,553 B1 | * | 5/2002 | Zetterstrom ................ | 280/5.51 |
| 6,450,585 B1 | * | 9/2002 | Kochsiek ................. | 301/124.1 |
| 6,722,459 B1 | * | 4/2004 | Wendl et al. ............... | 180/65.5 |
| 6,732,827 B1 | * | 5/2004 | San Miguel ................ | 180/242 |
| 2005/0056471 A1 | * | 3/2005 | Kurata ....................... | 180/65.5 |
| 2005/0061565 A1 | * | 3/2005 | Mizutani et al. ........... | 180/65.5 |

FOREIGN PATENT DOCUMENTS

JP 2001-32888 A 2/2001

\* cited by examiner

*Primary Examiner*—Jeff Restifo
(74) *Attorney, Agent, or Firm*—Foley & Lardner LLP

(57) ABSTRACT

An installation structure for an electric rotating machine such as an electric motor to a wheel of a motor vehicle. The installation structure comprises a wheel hub fixed to and rotatable with the wheel. A bearing through which the wheel hub is rotatably supported is provided. A suspension is installed between a vehicle body of the motor vehicle and the wheel. A bearing support member is connected to a wheel-side section of the suspension and supports the bearing. In the above installation structure, the electric rotating machine includes a power output shaft which is in fit with the wheel hub, and a flange for location of the electric rotating machine in a direction of axis of the power output shaft, the flange being brought into contact with a wheel-side section of the bearing support member.

7 Claims, 5 Drawing Sheets

INSTALLATION STRUCTURE FOR ELECTRIC ROTATING MACHINE IN MOTOR VEHICLE

BACKGROUND OF THE INVENTION

This invention relates to improvements in an installation structure for an electric rotating machine such as an electric motor provided to a wheel of a motor vehicle such as an electric vehicle.

Hitherto, an installation structure for an electric motor or the like to be disposed inside a wheel of a motor vehicle such as an electric vehicle has been proposed in Japanese Patent Provisional Publication No. 2001-32888, and arranged as follows: The electric motor is encased in a housing so as to constitute a drive unit. The vehicle body-side section of the housing is suspended through a suspension to a vehicle body. The wheel-side section of the housing is rotatably mounted on a wheel hub through a bearing in such a manner that a power output shaft (power transmission shaft) of the electric motor is fixed to a wheel hub which is fixed to a rim section of the wheel.

SUMMARY OF THE INVENTION

However, in the above conventional installation structure for the electric rotating machine for the wheel, a considerably large-sized unit is disposed inside the wheel. The housing of the drive unit is arranged to also serve as a bearing support member (so-called knuckle) to which control arms of the suspension and parts of a shock absorber are to be installed. Accordingly, in such a conventional installation structure, the considerably large-sized unit is installed inside the wheel in a location where parts such as an electric motor are not installed in a motor vehicle which is driven by an engine and extensively sold in the market. This requires to modify the shape or the like of existing parts (such as the suspension) located around the wheel and to increase restrictions in design for such parts thereby decreasing a freedom in design.

Additionally, the casing of the above drive unit is arranged to serve also as the bearing support member. Accordingly, an existing bearing support member (or knuckle) (to which an electric rotating machine such as an electric motor is not installed) used in a general motor vehicle cannot be used for the bearing support member in the above conventional installation structure. This requires to modify the existing bearing support member in design and to newly produce a part for exclusive use.

Further, when an assembly line of the motor vehicle is taken into consideration, the arrangement of peripheral parts of the drive unit is changed along with disposition of the drive unit, and therefore a change such as providing a new assembly line is required for assembling the drive unit in addition to a conventional assembly line for assembling the existing parts. Therefore, it seems that a production cost and the number of production steps are increased. Additionally, such a change is not preferable from the viewpoint of improving a production efficiency by standardization of assembly line.

It is, therefore, an object of the present invention to provide an improved installation structure for an electric rotating machine in a motor vehicle, which can effectively overcome drawbacks encountered in conventional similar installation structures.

Another object of the present invention is to provide an improved installation structure for an electric rotating machine in a motor vehicle, which can prevent a production cost and a number of assembly steps from increasing, while improving a production efficiency by standardization of an assembly line.

A further object of the present is to provide an improved installation structure for an electric rotating machine in a motor vehicle, which makes it possible to use existing parts and a conventional assembly line for assembling the existing parts when an electric rotating machine is installed to a wheel.

An aspect of the present invention resides in an installation structure for an electric rotating machine to a wheel of a motor vehicle, the electric rotating machine being for accomplishing at least one of an electrical driving for the wheel and an electric power generation by a power from the wheel. The installation structure comprises a wheel hub fixed to and rotatable with the wheel. A bearing through which the wheel hub is rotatably supported is provided. A suspension is installed between a vehicle body of the motor vehicle and the wheel. A bearing support member is connected to a wheel-side section of the suspension and supports the bearing. In the above installation structure, the electric rotating machine includes a power output shaft which is in fit with the wheel hub, and a flange for location of the electric rotating machine in a direction of axis of the power output shaft, the flange being brought into contact with a wheel-side section of the bearing support member.

Another aspect of the present invention resides in an installation structure for an electric rotating machine to a wheel of a motor vehicle, the electric rotating machine being for accomplishing at least one of an electrical driving for the wheel and an electric power generation by a power from the wheel. The installation structure comprises a wheel hub fixed to and rotatable with the wheel, the wheel hub including a cylindrical shaft section. A bearing counterpart member is provided including a cylindrical shaft section, and a flange section integral with the cylindrical shaft section. The cylindrical section of the bearing counterpart member is arranged coaxial with the cylindrical section of the wheel hub so as to form a cylindrical bearing. A suspension is installed between a vehicle body of the motor vehicle and the wheel. A bearing support member is connected to a wheel-side section of the suspension and supports the bearing. The bearing support member includes a section defining a hole. In the installation structure, the electric rotating machine includes a housing which is disposed in the hole of the bearing support member and extends toward the vehicle body. A power output shaft extends from the housing and passes through the bore of the cylindrical bearing to be fitted in the wheel hub. A flange is provided for location of the electric rotating machine in a direction of axis of the power output shaft. The flange is fixedly connected to the housing and brought into contact with a wheel-side section of the bearing support member. The flange is fastened to the bearing support member.

DETAILED DESCRIPTION OF THE INVENTION

Figure 1:
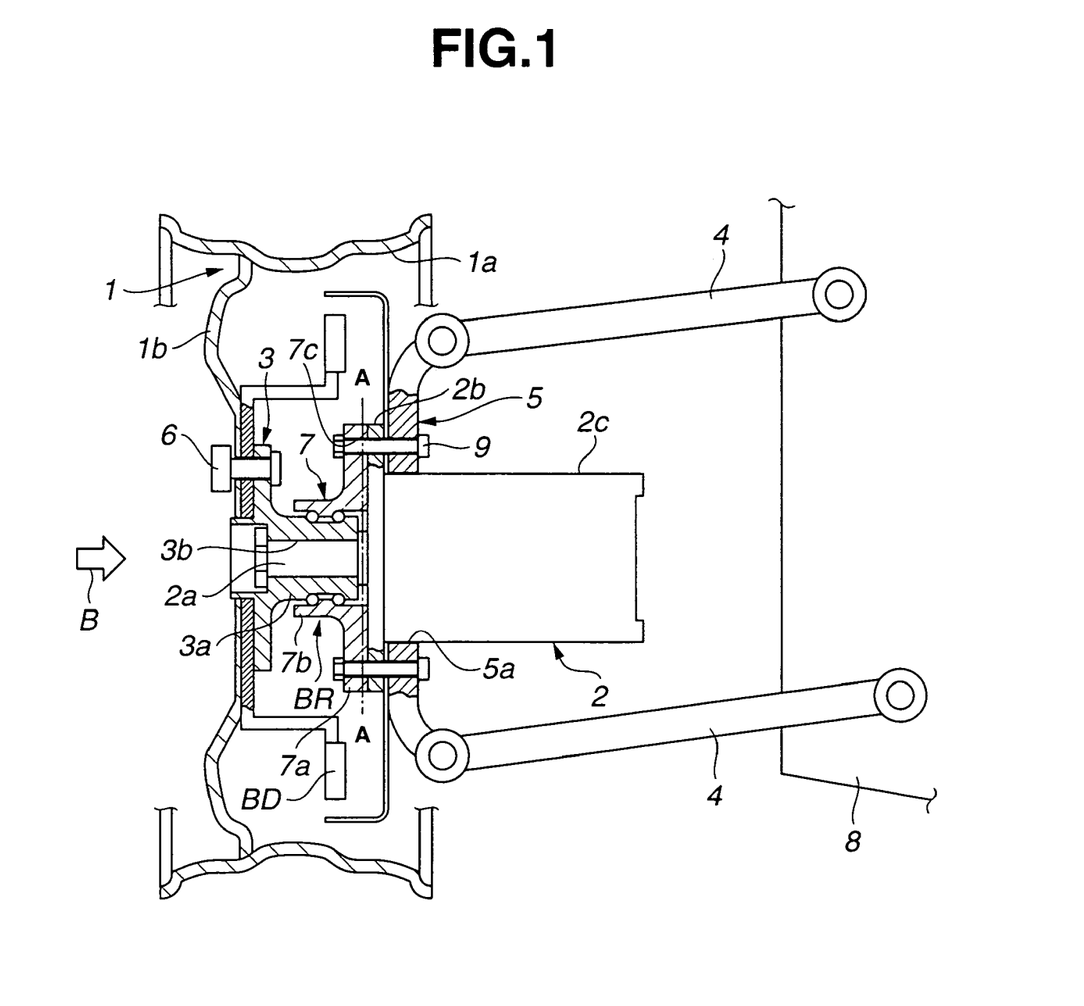
FIG. 1 is a schematic front view, partly in section, of a first embodiment of an installation structure for an electric rotating machine, according to the present invention.

Referring now to FIG. 1, a first embodiment of an installation structure for an electric motor, according to the present invention is illustrated in combination with an automotive vehicle as a motor vehicle. The automotive vehicle includes road wheels 1 one of which is shown. Wheel 1 is electrically driven by an electric motor 2 as an electric rotating machine which is installed generally inside wheel 1.

In the installation structure of this embodiment, wheel hub 3 is fixed to and rotatable with wheel 1. Additionally, ball bearing BR is provided to rotatably support wheel hub 3. Bearing support member (or so-called knuckle) 5 is connected to suspension 4 which is installed to vehicle body 8 of the automotive vehicle. Electric motor 2 has power output shaft 2a and provided with flange 2b for location of the electric motor in a direction of axis of the power output shaft. Flange is brought into contact with a wheel(1)-side section of bearing support member 5. Additionally, power output shaft 2a of electric motor 2 is in fit with wheel hub 3.

Figure 4:
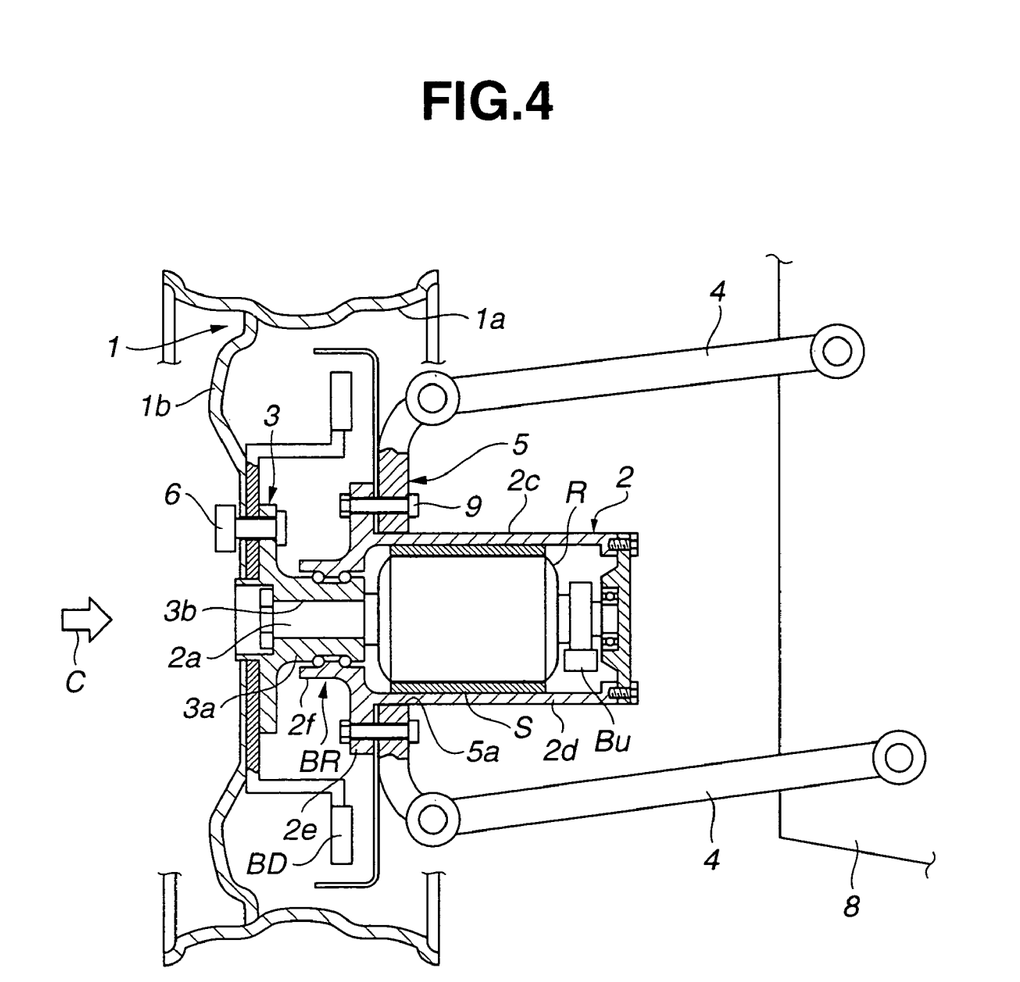
FIG. 4 is a schematic front view, partly section, of a second embodiment of the installation structure for an electric rotating machine, according to the present invention.

Electric motor 2 as the rotary electric machine is similar in structure and function to the electric motor 2 shown in FIG. 4. Accordingly, the electric motor 2 is general DC motor and has power output shaft (or power transmission shaft) 2a. Though not shown in FIG. 1, rotor R is fixed mounted on the power output shaft 2a so as to be rotatable with the power output shaft 2a as a single member. The rotor R is provided at its outer peripheral section with a coil. The electric motor 2 includes a housing 2 having an inner peripheral portion to which stator S formed of permanent magnet is installed. Bush Bu and the like are disposed around power output shaft 2a in a manner to be electrically connected to the coil of rotor R. As shown in FIG. 1, housing 2d is integrally formed with flange section 2b which extends radially outwardly. The electric motor 2 may be an induction AC motor, a synchronous AC motor, a DC brushless motor, or the like, and may be provided with a rotational speed reduction device.

Wheel hub 3 is fixedly installed to wheel 1 with fastening members 6 such as bolts or the like in such a manner that a brake disc BD is interposed between the wheel 1 and wheel hub 3. Wheel 1 includes a rim section 1a to which a disc section 1b fixed. A tire (not shown) is mounted on rim section 1a. Thus, wheel 1 and brake disc BD are fixedly supported to wheel hub 3 so as to be rotatable with wheel hub 3 as a single body. Wheel hub 3 includes a generally cylindrical shaft section 3a which also serves as an inner race of ball bearing BR as discussed after.

Figure 2:
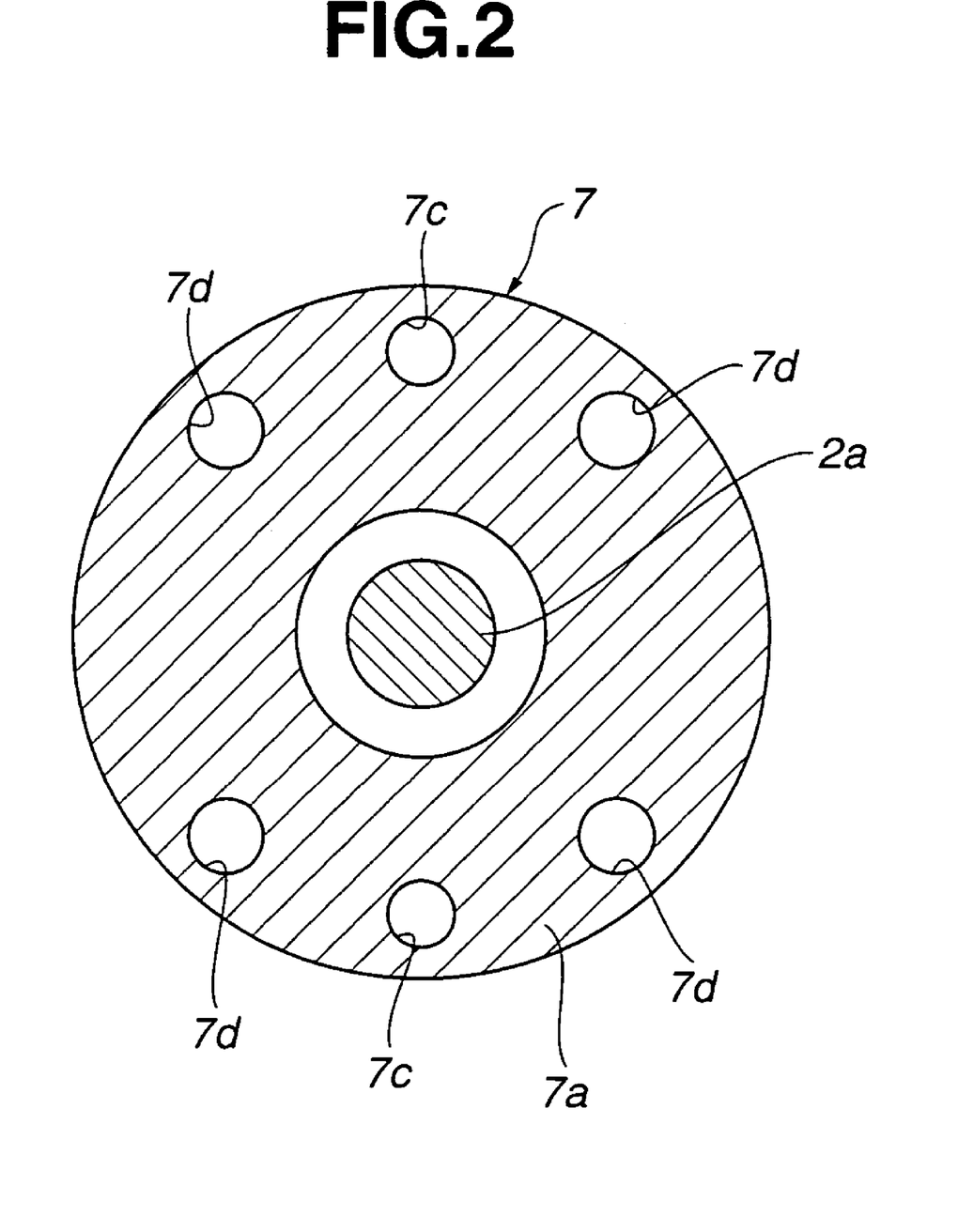
FIG. 2 is a cross-sectional view taken substantially along the line A—A of FIG. 1.

The ball bearing BR functions to rotatably support wheel hub 3, in which the inner race of ball bearing BR is constituted of shaft section 3a of wheel hub 3. The outer race of ball bearing BR is constituted of cylindrical shaft section 7b of a bearing outer member or bearing counterpart member 7 which has flange section 7a. Flange section 7a is formed with a plurality of (six in this embodiment) bolt holes 7c, 7d which are located at an outer peripheral section of flange section 7a as shown in FIG. 2. Bolt holes 7c, 7d are for the purpose of fastening electric motor 2 and bearing support member 5.

Two bolt holes 7c at the outer peripheral section of flange section 7a are newly formed in existing bearing outer member (7) in addition to bolt holes 7d. It will be understood that bolts holes 7d have been formed in the existing bearing out member (7), for the purpose of fastening electric motor 2. As illustrated in FIG. 1, the flange section 2b of electric motor 2 and bearing support member 5 are also formed with bolt holes which respectively correspond to bolt holes 7c, 7d.

Suspension 4 is constituted of a shock absorber, suspension arms and the like, and installed to connect vehicle body 8 of the automotive vehicle and wheel 1. More specifically, suspension 4 has a body(8)-side section attached to the vehicle body 8, and a wheel(1)-side section attached to bearing support member 5. As discussed after, bearing support member 5 is installed to wheel 1 through ball bearing BR and wheel hub 3.

Bearing support member 5 supports ball bearing BR at the wheel-side section of suspension 4 and is supported through suspension 4 to vehicle body 8. Bearing support member 5 of this embodiment is formed with center hole 5a in which main body section 2c of electric motor 2 is disposed. Accordingly, hole 5a of bearing support member 5 has such a size that main body section 2c is fitted therein and extend through hole 5a.

Next, installation of electric motor 2 to wheel 1 in the above installation structure will be discussed.

First, the vehicle body(8)-side end section of the bearing support member 5 is connected to the wheel(1)-side section of suspension 4 which is installed at its vehicle-body side to vehicle body 8 in an assembly step which is similar to a conventional assembly step. Then, main body section 2c of electric motor 2 is inserted into hole 5a of bearing support member 5 in the direction of an arrow B from the outside of the vehicle and pushed rightward in FIG. 1. Thereafter, flange 2b of electric motor 2 is put between the wheel-side section of bearing support member 5 and flange section 7a of bearing outer member 7, followed by fastening bearing support member 5, electric motor flange section 2b and bearing outer member flange section 7a with bolts 9. It will be understood that wheel hub 3 provided with bearing outer member 7 is installed together with brake disc BD to wheel 1 at an assembly step similar to a conventional assembly step.

In installation of electric motor 2, when main body section 2c of electric motor 2 is inserted into hole 5a of bearing support member 5 in the direction of an arrow B from the outside of the vehicle in a state of being directed to the vehicle body 8, flange section 2b of electric motor 2 is brought into contact with the wheel-side section of the bearing support member 5 thereby locating electric motor 2 in the axial direction of the power output shaft 2a of electric motor 2. In this embodiment, the wheel-side section of bearing support member 5 and flange section 2b of electric motor 2 are brought into contact with each other through a plate having a generally C-shaped cross-section. In a state where wheel hub 3 is installed to wheel 1, power output shaft 2a of electric motor 2 is fitted in cylindrical shaft section 3a of wheel hub 3 in such a manner that the outer peripheral surface of power output shaft 2a is in contact with the inner peripheral surface (portion) 3b of cylindrical shaft section 3a.

Figure 3:
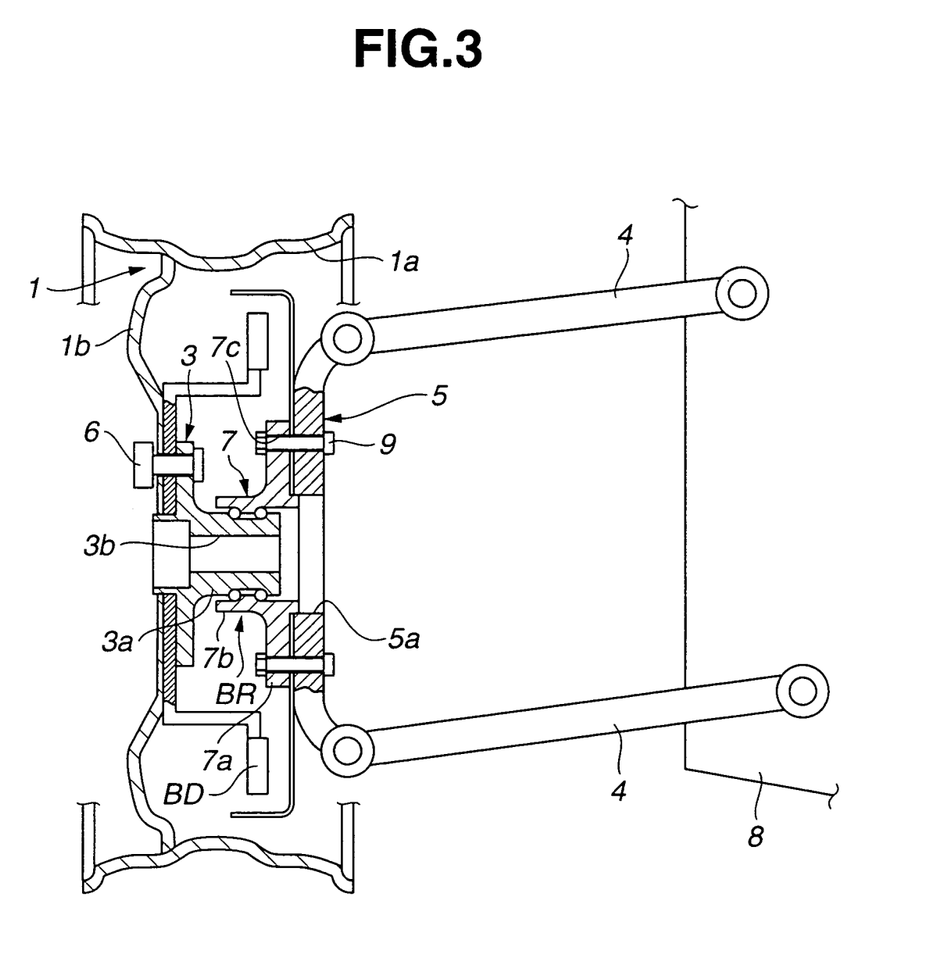
FIG. 3 is a schematic front view, partly in section, of an arrangement around a wheel, for the purpose of explaining effects obtained by the installation structure of the installation structure of FIG. 1.

As seen from FIG. 3, as wheel 1, wheel hub 3, ball bearing BR, suspension 4 and bearing support member 5 of this embodiment, existing ones for a wheel which is not equipped with an electric rotating machine such as an electric motor can be used. Accordingly, assembly operation of such parts can be accomplished on a conventional assembly line. Thus, according to the installation structure for the electric rotating machine for the wheel in this embodiment, the existing parts which are used for the wheel which is not equipped with the electric rotating machine such as the electric motor can be employed as wheel 1, wheel hub 3, ball bearing BR, suspension 4 and bearing support member 5 in this embodiment. Additionally, installation of electric motor 2 to the wheel can be accomplished in the conventional assembly line which is arranged to assemble the existing parts.

Further, since flange section 2b of electric motor 2 is brought into contact with the wheel-side section of bearing support member 5, location for electric motor 2 in axial direction of power output shaft 2a of the electric motor can be readily accomplished. Furthermore, flange section 2b of electric motor 2 and bearing support member 5 are fastened with bolts 9, and therefore electric motor 2 can be readily fixed to and supported by bearing support member 5 without changing the shape or the like of the existing parts.

Additionally, since power output shaft 2a of electric motor 2 is fitted in the inner peripheral portion 3b of cylindrical shaft section 3a of wheel hub 3, the rotational force output from power output shaft 2a of electric motor 2 is transmitted through wheel hub 3 to wheel 1, thereby driving the automotive vehicle. Thus, with such an arrangement, transmission of the rotational force between electric motor 2 and wheel 1 can be readily accomplished through power output shaft 2a of electric motor 2 and wheel hub 3.

Assume that main body section 2c of electric motor 2 is located on the side of wheel 1 relative to bearing support member 5. In this case, if the existing parts are used for suspension arms of suspension 4, a tread is unavoidably widened by an amount corresponding to the length of main body section 2c of electric motor 2. In order to avoid such a difficulty, it will be necessary to shorten the suspension arms of suspension 4. In this regard, according to the installation structure for the electric rotating machine for the wheel in this embodiment, electric motor 2 is installed in such a manner that its main body section 2c is disposed in hole 5a of bearing support member 5, and therefore main body section 2c of electric motor 2 is located on the side of the vehicle body 8 relative to bearing support member 5. This prevents the tread from being widened, thereby making it unnecessary to modify the suspension arms or the like of suspension 4.

Furthermore, according to the above arrangement of this embodiment, at an assembly step for installing ball bearing BR to bearing support member 5, an assembly operation for inserting the main body section of electric motor 2 into hole 5a of bearing support member 5 can be accomplished thereby making it unnecessary to employ a special assembly line which is, for example, arranged by modifying a conventional assembly line for assembling the existing parts. This promotes standardization of assembly line thereby improving a production efficiency of the automotive vehicle. It will be understood that existing hole 5a of bearing support member 5 as shown in FIG. 3 is used as hole 5a of bearing support member 5 in this embodiment as shown in FIG. 1.

In addition, in this embodiment, main body section 2c of electric motor 2 is inserted in hole 5a of bearing support member 5, and therefore the contacting surface between flange section 2b of electric motor 2 and wheel-side section of bearing support member 5 can be approached to the center in width direction between right-side and left-side wheels 1 of the automotive vehicle, while main body section 2c which is relatively heavy in weight can be located on the side of the vehicle body 8. Consequently, a moment generated with movement of wheel 1 can be reduced thereby improving a riding quality.

FIG. 4 illustrates a second embodiment of the installation structure for the electric rotating machine for the wheel, according to the present invention, which is similar to the above-discussed embodiment shown in FIG. 1 mainly with the exception that electric motor 2 is formed integral with ball bearing BR for supporting wheel hub 3.

Specifically, in this embodiment, bearing outer member 7 (shown in FIG. 1) in the embodiment of FIG. 1 is formed integral with housing 2d of electric motor 2. This provides bearing-flange section 2e in which flange section 7a (as shown in FIG. 1) and flange section 2b of electric motor 2 (as shown in FIG. 1) in the first embodiment are integrally connected.

In this embodiment, electric motor 2 is similar in function to that 2 in the first embodiment. Accordingly, electric motor 2 is general DC motor and has power output shaft (or power transmission shaft) 2a. A rotor R is fixedly mounted on the power output shaft 2a so as to be rotatable with the power output shaft 2a as a single member. The rotor R is provided at its outer peripheral section with a coil. The electric motor 2 includes a housing 2d having an inner peripheral portion to which stator S formed of permanent magnet is installed. Bush Bu and the like are disposed around power output shaft 2a in a manner to be electrically connected to the coil of rotor R. The electric motor 2 may be an induction AC motor, a synchronous AC motor, a DC brushless motor, or the like, and may be provided with a rotational speed reduction device, similarly to in the first embodiment.

Next, installation of electric motor 2 to wheel 1 in this embodiment will be discussed.

First, the vehicle body-side section of the bearing support member 5 is connected to the wheel-side section of suspension 4 which is installed at its vehicle-body side to vehicle body 8 in an assembly step which is similar to a conventional assembly step. Then, main body section 2c of electric motor 2 is inserted into hole 5a of bearing support member 5 in the direction of an arrow C in FIG. 4 from the outside of the vehicle and pushed rightward in FIG. 4. Thereafter, bearing-flange section 2e of electric motor 2 is brought into contact with the wheel-side section of bearing support member 5, followed by fastening bearing support member 5 and bearing-flange section 2e with bolts 9. It will be understood that wheel hub 3 is installed together with brake disc BD to wheel 1 at an assembly step similar to a conventional assembly step.

Thus, according to the installation structure of the electric rotating machine for the wheel in this embodiment, installation of electric motor 2 can be also accomplished by making an assembly operation of flange section 7a of bearing outer member 7 of ball bearing BR with a conventional arrangement as shown in FIG. 3, in a conventional assembly line for assembling the existing parts. Accordingly, with the arrangement of this embodiment, the same effects as those in the first embodiment can be obtained. Additionally, the installation operation of electric motor 2 can be readily accomplished by an operation similar to the installation operation for ball bearing BR with the conventional arrangement while preventing the number of assembly steps for installation of electric motor 2 from increasing.

Furthermore, there is no abutting (contacting) surface between ball bearing BR and electric motor 2, and therefore it is unnecessary to use a seal member to be interposed between the contacting surfaces of ball bearing BR and electric motor 2 while ensuring a water-resistance at such a section which has no abutting surface.

Figure 5:
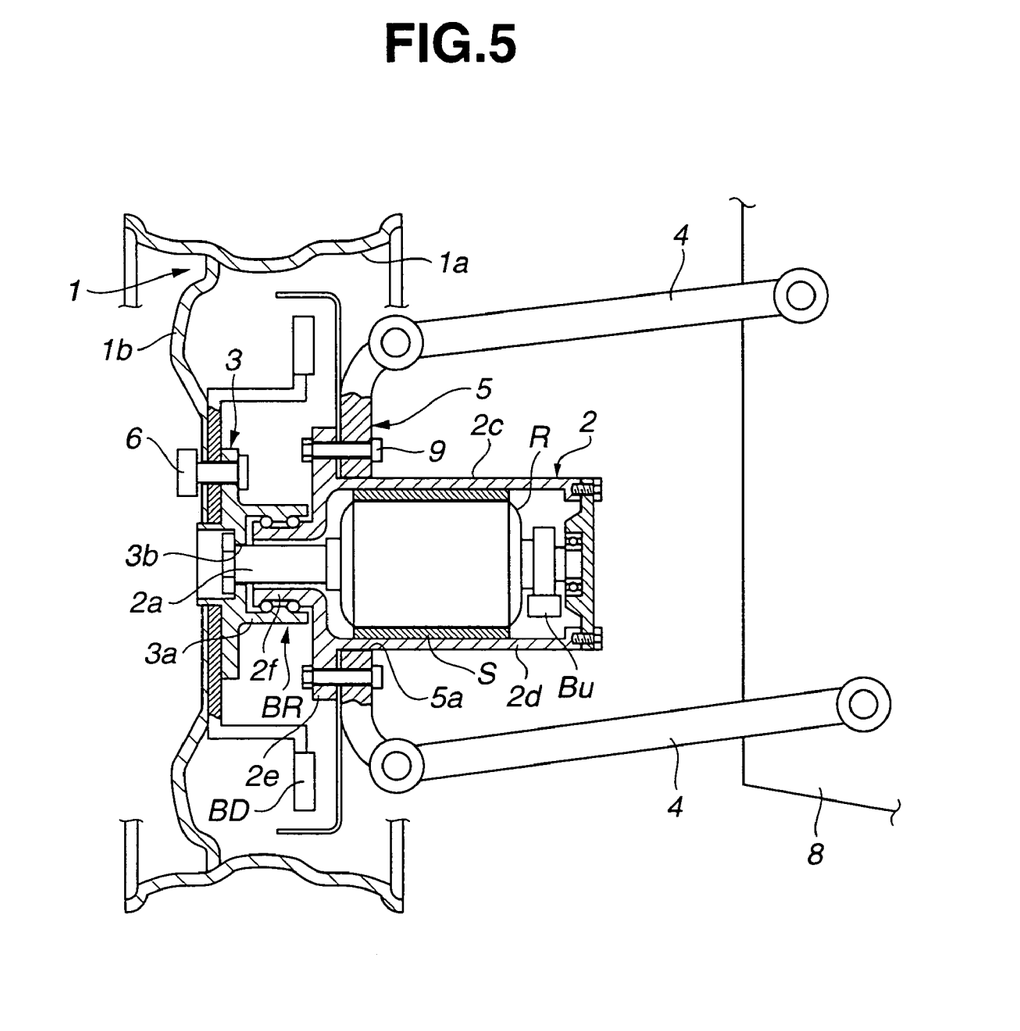
FIG. 5 is a schematic front view, partly in section, of a modified example of the second embodiment of the installation structure.

FIG. 5 shows a modified example of ball bearing BR constituted of wheel hub 3 and housing 2d, used in the second embodiment. In this example, the inner race of ball bearing BR is constituted of cylindrical shaft section 2f which is formed integral with housing 2d of electric motor 2. Additionally, the outer race of ball bearing BR is constituted of cylindrical shaft section 3a of wheel hub 3. Thus, the arrangement of the second embodiment can be suitably changed according to the existing parts.

Although the principle of the present invention has been discussed with reference to the drawings, it will be understood that present invention is not limited to the above embodiments and their modified examples. For example, in the first embodiment, the outer race of ball bearing BR may be constituted of cylindrical shaft section 3a of wheel hub 3, while the inner face of ball bearing BR may be constituted of cylindrical shaft section 7b of bearing outer member 7.

Furthermore, while main body section 2c of electric motor 2 has been shown and described as being located on the side of vehicle body 8 relative to bearing support member 5, it will be appreciated that the principle of the installation structure according to the present invention may be applied to an installation structure which is arranged such that the electric rotating machine includes a flange for location of the electric rotating machine in a direction of axis of a power output shaft of the electric rotating machine, in which the flange is brought into contact with the wheel-side section of the bearing support member while the power output shaft of the electric rotating machine is in fit to the wheel hub. Accordingly, the main body section 2c of electric motor 2 may be located on the side of wheel 1 relative to bearing support member 5.

Moreover, while only electric motor 2 has been shown and described as the electric rotating machine for wheel, it will be understood that the electric rotating machine to be applied to the installation structure for wheel according to the present invention may not be limited to electric motor 2 in the above embodiments. As the electric rotating machine of the present invention, a generator, an electric motor, or a motor/generator for a regenerative brake may be used, the generator being for generating electricity by power from wheel of the vehicle, the electric motor being for driving wheel of the vehicle, the motor/generator being for generating electricity by power from wheel of the vehicle.

The entire contents of Japanese Patent Application P2002-341939 (filed Nov. 26, 2002) are incorporated herein by reference.

Although the invention has been described above by reference to certain embodiments and examples of the invention, the invention is not limited to the embodiments and examples described above. Modifications and variations of the embodiments and examples described above will occur to those skilled in the art, in light of the above teachings. The scope of the invention is defined with reference to the following claims.

What is claimed is:

1. An installation structure for an electric rotating machine to a wheel of a motor vehicle, the electric rotating machine being for accomplishing at least one of an electrical driving for the wheel and an electric power generation by a power from the wheel, the installation structure comprising:
a wheel hub fixed to and rotatable with the wheel;
a bearing through which the wheel hub is rotatably supported;
a suspension installed between a vehicle body of the motor vehicle and the wheel;
a bearing support member connected to a wheel-side section of the suspension and supporting the bearing; and
a bearing counterpart member flange disposed adjacent to the bearing support member;
wherein the electric rotating machine includes a power output shaft, which fits the wheel hub, and a housing flange for location of the electric rotating machine in a direction of an axis of the power output shaft, the housing flange being located between a wheel-side section of the bearing support member and the bearing counterpart member flange, the wheel-side section of the bearing support member facing towards the wheel in the direction of the axis of the power output shaft.

2. An installation structure as claimed in claim 1, wherein the bearing support member includes a section defining a hole, wherein the electric rotating machine is disposed in the hole in a manner to extend through the hole.

3. An installation structure as claimed in claim 1, wherein the bearing is formed integral with the electric rotating machine.

4. An installation structure for an electric rotating machine to a wheel of a motor vehicle, the electric rotating machine being for accomplishing at least one of an electrical driving for the wheel and an electric power generation by a power from the wheel, the installation structure comprising:
a wheel hub fixed to and rotatable with the wheel, the wheel hub including a cylindrical shaft section;
a bearing counterpart member including a cylindrical shaft section, and a bearing counterpart member flange section integral with the cylindrical shaft section, the cylindrical section of the bearing counterpart member being arranged coaxial with the cylindrical section of the wheel hub so as to form a cylindrical bearing;
a suspension installed between a vehicle body of the motor vehicle and the wheel; and
a bearing support member connected to a wheel-side section of the suspension and supporting the bearing, the bearing support member including a section defining a hole;
wherein the electric rotating machine includes a housing which is disposed in the hole of the bearing support member and extends toward the vehicle body, a power output shaft which extends from the housing and passes through the bore of the cylindrical bearing to be fitted in the wheel hub, and a housing flange for location of the electric rotating machine in a direction of an axis of the power output shaft, the housing flange being fixedly connected to the housing and brought into contact with a wheel-side section of the bearing support member, the wheel-side section of the bearing support member facing towards the wheel in the direction of the axis of the power output shaft, the housing flange being fastened to the bearing support member on the wheel-side section of bearing support member.

5. An installation structure as claimed in claim 4, wherein the housing flange section is formed integral with the bearing counterpart member flange section so as to form a bearing-flange section.

6. An installation structure as claimed in claim 5, wherein the bearing-flange section being fastened to the bearing support member.

7. An installation structure for an electric rotating machine to a wheel of a motor vehicle, the electric rotating machine being for accomplishing at least one of an electrical driving for the wheel and an electric power generation by a power from the wheel, the installation structure comprising:
- a wheel hub fixed to and rotatable with the wheel;
- a bearing through which the wheel hub is rotatably supported;
- a suspension installed between a vehicle body of the motor vehicle and the wheel; and
- a bearing support member connected to a wheel-side section of the suspension and supporting the bearing, wherein the electric rotating machine includes a power output shaft which fits the wheel hub, and a flange for location of the electric rotating machine in a direction of the axis of the power output shaft, the flange being brought into contact with a wheel-side section of the bearing support member, wherein the flange of the electric rotating machine is disposed between and fastened to the bearing support member and a flange section of a bearing counterpart member.

* * * * *